United States Patent
Martin et al.

(10) Patent No.: US 10,527,787 B1
(45) Date of Patent: Jan. 7, 2020

(54) SINGLE EDGE COUPLING OF CHIPS WITH INTEGRATED WAVEGUIDES

(71) Applicant: International Business Machines Corporation, Armonk, NY (US)

(72) Inventors: Yves Martin, Ossining, NY (US); Jason S. Orcutt, Katonah, NY (US); Tymon Barwicz, Yorktown Heights, NY (US); William Green, Irvington, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/270,886

(22) Filed: Feb. 8, 2019

Related U.S. Application Data

(63) Continuation of application No. 16/015,884, filed on Jun. 22, 2018, now Pat. No. 10,302,859.

(51) Int. Cl.
   *G02B 6/12* (2006.01)
   *G02B 6/125* (2006.01)
   *G02B 6/124* (2006.01)
   *G02B 6/136* (2006.01)

(52) U.S. Cl.
   CPC ......... *G02B 6/12004* (2013.01); *G02B 6/124* (2013.01); *G02B 6/125* (2013.01); *G02B 6/136* (2013.01); *G02B 2006/12142* (2013.01); *G02B 2006/12164* (2013.01)

(58) Field of Classification Search
   CPC .... G02B 6/12004; G02B 6/124; G02B 6/125; G02B 6/136; G02B 2006/12142; G02B 2006/12164
   See application file for complete search history.

(56) References Cited

U.S. PATENT DOCUMENTS

| | | | |
|---|---|---|---|
| 4,932,736 | A | 6/1990 | Su |
| 5,745,612 | A | 4/1998 | Wang et al. |
| 6,435,291 | B2 | 8/2002 | Lemke et al. |
| 6,438,291 | B1 | 8/2002 | Duck et al. |

(Continued)

FOREIGN PATENT DOCUMENTS

WO    2016070186 A1    5/2016

OTHER PUBLICATIONS

List of IBM Patents or Patent Applications Treated as Related.
(Continued)

*Primary Examiner* — Akm E Ullah
(74) *Attorney, Agent, or Firm* — Vazken Alexanian; Ryan, Mason & Lewis, LLP

(57) ABSTRACT

Techniques are provided for single edge coupling of chips with integrated waveguides. For example, a package structure includes a first chip with a first critical edge, and a second chip with a second critical edge. The first and second chips include integrated waveguides with end portions that terminate on the first and second critical edges. The second chip includes a signal reflection structure that is configured to reflect an optical signal propagating in one or more of the integrated waveguides of the second chip. The first and second chips are edge-coupled at the first and second critical edges such that the end portions of the integrated waveguides of the first and second chips are aligned to each other, and wherein all signal input/output between the first and second chips occurs at the single edge-coupled interface.

16 Claims, 8 Drawing Sheets

(56) References Cited

U.S. PATENT DOCUMENTS

| | | | |
|---|---|---|---|
| 6,786,787 B2 | 9/2004 | Yanagisawa | |
| 6,856,735 B2 | 2/2005 | Chang et al. | |
| 7,116,851 B2 * | 10/2006 | Welch | B82Y 20/00 |
| | | | 385/14 |
| 7,133,428 B2 | 11/2006 | Kitaoka et al. | |
| 7,251,385 B2 * | 7/2007 | Kondo | G02B 6/43 |
| | | | 257/499 |
| 7,298,941 B2 | 11/2007 | Palen et al. | |
| 7,609,931 B2 | 10/2009 | Logvin et al. | |
| 7,634,395 B2 | 12/2009 | Flandrin et al. | |
| 7,668,409 B2 | 2/2010 | Sugiyama | |
| 8,149,891 B2 | 4/2012 | Funabashi | |
| 8,524,563 B2 | 9/2013 | Flachowsky et al. | |
| 8,742,872 B2 | 6/2014 | Iwasaki et al. | |
| 8,755,655 B2 | 6/2014 | Krishnamoorthy et al. | |
| 9,606,308 B2 | 3/2017 | Barigicz et al. | |
| 9,612,398 B2 * | 4/2017 | Vurgaftman | G02B 6/122 |
| 9,786,641 B2 * | 10/2017 | Budd | G02B 6/4204 |
| 9,857,531 B2 | 1/2018 | Budd et al. | |
| 9,867,290 B2 | 1/2018 | Pen et al. | |
| 10,001,601 B2 | 6/2018 | Wohlfeil et al. | |
| 2003/0003734 A1 * | 1/2003 | Delwala | B82Y 20/00 |
| | | | 438/689 |
| 2008/0056638 A1 | 3/2008 | Glebov et al. | |
| 2014/0348461 A1 | 11/2014 | Budd et al. | |
| 2015/0285997 A1 | 10/2015 | Pan et al. | |
| 2016/0131837 A1 | 5/2016 | Mahgerefteh et al. | |
| 2016/0170141 A1 | 6/2016 | Luo et al. | |
| 2016/0179141 A1 * | 6/2016 | Kim | G06F 1/1652 |
| | | | 361/749 |
| 2017/0186739 A1 | 6/2017 | Budd et al. | |

OTHER PUBLICATIONS

A.S. Kewitsch et al, "All-Fiber Zero-Insertion-Loss Add-Drop Filter for Wavelength-Division Multiplexing," Optics Letters, Jan. 15, 1998, pp. 106-108, vol. 23, No. 2.

* cited by examiner

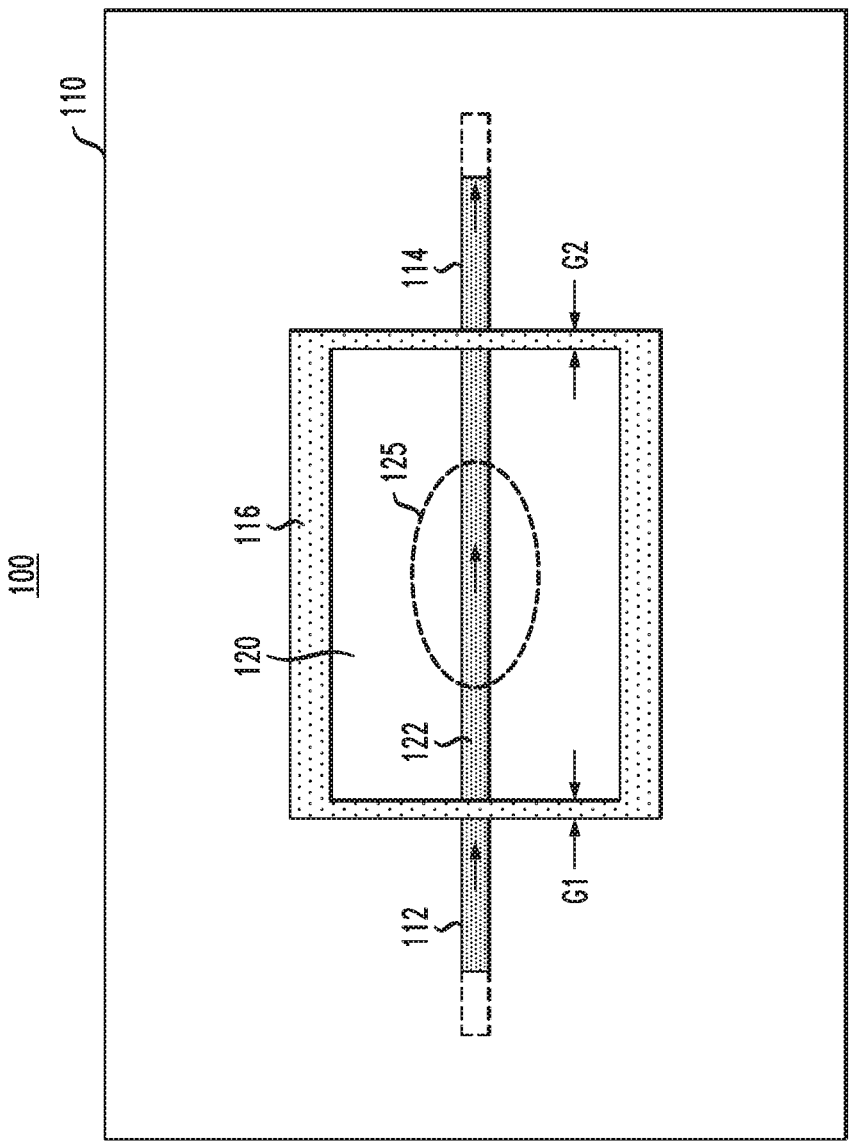
FIG. 1
100
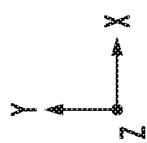

200

400

700

SINGLE EDGE COUPLING OF CHIPS WITH INTEGRATED WAVEGUIDES

TECHNICAL FIELD

This disclosure generally relates to packaging and assembly of microelectronic, photonic and optoelectronic devices with integrated waveguides.

BACKGROUND

In photonics applications, photonic chips, optoelectronic (OE) chips, and other types of chips are typically packaged together to implement various functions with regard to light including, for example, generating, emitting, transmitting, modulating, signal processing, amplifying, and/or detecting/sensing light within the visible and near-infrared portions of the electromagnetic spectrum. Various techniques are used for aligning and edge coupling two or more chips, which have integrated waveguide structures, to allow passing of wave signals between the edge-coupled chips which process the wave signals. Mechanical alignment of the chips must be very precise in three-dimensions so that there is sufficient alignment between the input/output portions of the integrated waveguides between the edge-coupled chips. Indeed, in cases where photonic chips and and/or OE chips containing integrated waveguide structures are edge-coupled to each other in a package structure, if there is misalignment between the end portions of the integrated waveguides at the edge-coupled interface between the different chips, there can be significant reflection and loss of optical signals at the edge-coupled interfaces. The reflection of optical signals is known to cause undesirable effects such as, by way of example only, increased laser relative intensity noise (RIN), cavity-induced wavelength dependencies, and optical amplifier gain ripple. In this regard, chip-to-chip edge coupling is one of the persistent challenges in photonics systems due to limitations and tolerances in, e.g., the semiconductor fabrication techniques used to fabricate the chips, and the tools utilized for assembling chip package structures.

SUMMARY

Embodiments of the invention include devices and methods for single edge coupling of chips with integrated waveguides. For example, in one embodiment, a package structure comprises a first chip and a second chip. The first chip comprises a first critical edge, a first integrated waveguide, and a second integrated waveguide, wherein the first and second integrated waveguides of the first chip each comprise an end portion that terminates on the first critical edge of the first chip. The second chip comprises a second critical edge, a first integrated waveguide, a second integrated waveguide, and a signal reflection structure, wherein the first and second integrated waveguides of the second chip each comprise an end portion that terminates on the second critical edge of the second chip, and an end portion that is coupled to the signal reflection structure. The signal reflection structure is configured to reflect an optical signal propagating in at least one of the first and second integrated waveguides of the second chip. The first and second chips are edge-coupled at the first and second critical edges such that the end portions of the first integrated waveguides of the first and second chips are aligned to each other, and the end portions of the second integrated waveguides of the first and second chips are aligned to each other.

These and other embodiments of the invention will be described or become apparent from the following detailed description of embodiments, which is to be read in conjunction with the accompanying drawings.

BRIEF DESCRIPTION OF THE DRAWINGS

FIG. 1 schematically illustrates a package structure which implements multi-edge coupling of chips with integrated waveguides.

DETAILED DESCRIPTION

Figure 2:
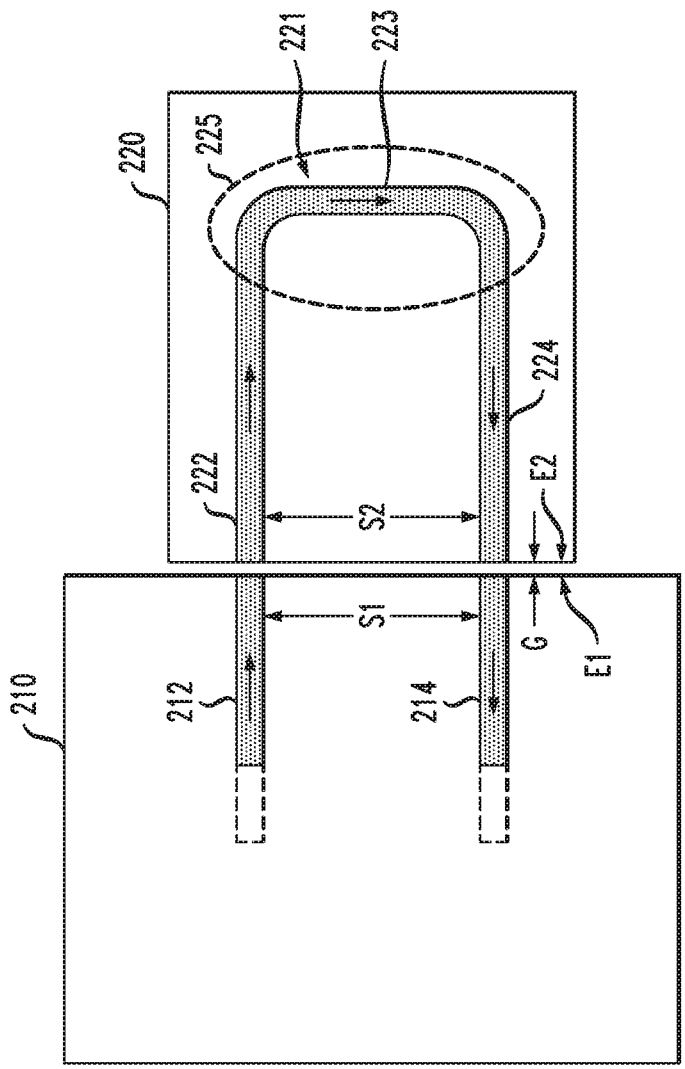
FIG. 2 schematically illustrates a package structure which implements single edge coupling of chips with integrated waveguides, according to an embodiment of the invention.

Embodiments of the invention will now be discussed in further detail with regard to the assembly of microelectronic, photonic and optoelectronic devices using single edge coupling techniques which facilitate three-dimensional alignment and coupling of photonics and OE chips with integrated waveguides. While embodiments of the invention can be utilized in various applications in which wave signals are transmitted between edge-coupled chips, for purposes of illustration, exemplary embodiments of the invention will be discussed in the context of optical applications in which three-dimensional alignment is achieved to align integrated waveguide structures of photonics and optoelectronic chips using single edge coupling techniques. As explained in further detail below, rather than transmitting an optical signal from one edge of an OE chip to another (different) edge of the OE chip, embodiments of the invention implement techniques to enable the coupling of optical signals to/from a single edge of the OE chip, wherein all signal I/O (input/output) between two edge-coupled chips occurs at a single edge-coupled interface between the chips. The single edge coupling techniques as discussed herein achieve higher performance and lower costs for manufacturing and assembly, as compared to conventional multi-edge coupling techniques.

For example, FIG. 1 schematically illustrates a package structure 100 which implements multi-edge coupling of chips with integrated waveguides. The package structure 100 comprises a first chip 110 and a second chip 120. The first chip 110 comprises a first integrated waveguide 112, a second integrated waveguide 114, and a recessed cavity 116 formed in a surface of the first chip 110. The second chip 120 comprises an integrated waveguide 122 which extends from one edge to an opposite edge the second chip 120, and which passes through an active area 125 that comprises signal processing circuitry. The second chip 120 is mounted in the cavity 116 of the first chip 110 using known mounting and alignment techniques to align the first and second integrated waveguides 112 and 114 of the first chip 110 to the respective ends of the integrated waveguide 122 of the second chip 120. With the package structure 100 of FIG. 1, the mounting and alignment process is performed to enable edge coupling of the first and second chips 110 and 120 so that a wave signal (e.g., optical signal) propagating in the first integrated waveguide 112 of the first chip 110 can be sufficiently coupled to an input end of the integrated waveguide 122 of the second chip 120, and propagate along the integrated waveguide 122 for processing in the active region 125, and then output to the first chip 110 by coupling the processed signal from an output end of the integrated waveguide 122 to an input of the second integrated waveguide 114 of the first chip 110 (in FIG. 1, the direction of wave propagation is illustrated by arrows in the integrated waveguides 112, 122, and 114).

For photonic applications, the first chip 110 may be a photonic chip comprising a silicon (Si) substrate, a lithium niobate (Limb) substrate, a compound III-V semiconductor substrate (e.g., gallium arsenide (GaAs), indium phosphide (InP), etc.), or other suitable substrates, having circuitry to convert electrical signals to optical signals (e.g., laser diodes) and integrated waveguides to guide the optical signals to/from target locations. The first chip 110 may also comprise an interface structure to couple optical fibers to the first chip 110 (via adiabatic coupling or other known coupling techniques) to enable coupling of optical signals between the optical fibers and the integrated waveguides of the first chip 110. The integrated waveguides 112, 114, and 122 of the chips 110 and 120 comprise waveguide cores with rectangular-shaped cross-sections, and cladding layers that surround or otherwise encapsulate the waveguide cores. The types of semiconductor materials that are used to form the waveguide cores and the types of materials used to form the cladding layers will vary depending on the application.

For example, the integrated waveguides can be fabricated to have semiconductor cores (e.g., Si or silicon nitride) and insulating (e.g., silicon oxide) cladding layers. In this instance, the integrated waveguide cores can be patterned from a semiconductor layer of a semiconductor-on-insulator substrate, and the cladding layers can be formed by depositing and patterning a cladding material to form the cladding layers on the sides and upper surfaces of the patterned waveguide cores. In other embodiments, the cladding on the sides and upper surfaces of the semiconductor cores may be air. In other embodiments, the waveguide cores can be formed by doping surface regions of a semiconductor substrate (e.g., doping surface regions of a LiNb substrate), wherein the doped regions form the integrated waveguide structures. Although the size of the waveguide core and cladding layer will vary depending on the material used and the operating wavelengths, a silicon waveguide core can have a width that is about 0.3 microns and a height of about 0.15 microns, while the cladding layer can have a thickness of several microns. The basic design of an integrated waveguide (e.g., single-mode waveguide) is to have a waveguide core that is formed of a material with a high refractive index and a surrounding cladding layer that is formed with a material having a lower refractive index.

In addition, the second chip 120 may comprise a special purpose optoelectronic (OE) chip having optical signal processing circuitry (formed within the active region 125) such as semiconductor optical amplifier (SOA) circuitry, EO modulator circuitry, wavelength-division multiplexing (WDM) circuitry, etc., for processing optical signals that are coupled from the first chip 110. As is known in the art, a SOA is device that can amplify an optical signal directly, without having to convert the optical signal to an electrical signal. A WDM circuit is configured to multiplex a plurality of optical carrier signals into a single optical fiber (or optical waveguide transmission medium) using different wavelengths of laser light. Further, an EO modulator is a device that is configured to modulate the power, phase, or polarization of an optical signal (e.g., laser beam) with an electrical control signal. For example, an EO phase modulator is a device which is configured to change a phase delay of an optical signal that propagates through the EO phase modulator device by the application of a control voltage.

The package structure 100 of FIG. 1 illustrates an example in which the first chip 110 serves as mechanical substrate to support the second chip 120 (e.g., OE chip) which is mounted within the cavity 116 of the first chip 110. In other embodiments, multiple chips can be edge-coupled together to form a chain of OE processing components in which a propagating optical signal is sequentially transmitted from one chip to the next (via edge coupling of integrated waveguides) and processed (e.g., modulated, amplified, etc.) to implement a given photonics application.

In the package structure 100 shown in FIG. 1, an assembly process is utilized to ensure a proper three-dimensional alignment between the first and second chips 110 and 120 so that the coupling ends of the integrated waveguides are sufficiently aligned to each other in the X, Y and Z directions, as indicted by XYZ Cartesian coordinates shown in FIG. 1. It is to be understood that the term "vertical" as used herein denotes a Z-direction of the Cartesian coordinates shown in the drawings, and that the terms "horizontal" or "lateral" as used herein denotes an X-direction and/or Y-direction of the Cartesian coordinates shown in the drawings, which is perpendicular to the Z-direction. In particular, the Z-direction alignment (which is perpendicular to the plane (surface) of the chips 110 and 120) ensures that the second chip 120 is mounted in the cavity 116 such that ends of the integrated waveguide 122 of the second chip are disposed at the same vertical height as the ends of the integrated waveguides 112 and 114 exposed on the sidewall edges of the etched cavity 116. In addition, the Y-direction alignment ensures that the second chip 120 is mounted in the cavity 116 such that ends of the integrated waveguide 122 at the opposing edges of the second chip 120 are laterally aligned to the ends of the integrated waveguides 112 and 114 exposed on the sidewall edges of the etched cavity 116. In this regard, a proper Y and Z alignment is achieved when the cross-sectional areas of adjacent end portions of the integrated waveguides on the different chip either completely or substantially overlap to ensure sufficient optical signal coupling between the adjacent ends of the integrated waveguides.

Further, the X-direction alignment ensures that the second chip 120 is mounted in the cavity 116 such that a gap size G1 and G2 of the gaps between the critical edges of the chips 110 and 120 (e.g., the sidewalls of the cavity 116 and the edges of the second chip 120 adjacent to the cavity sidewalls) are sufficiently small. In this regard, alignment in the X direction is crucial to ensure that the gap sizes G1 and G2 are less than a maximum gap size (e.g., less than 1 micron) for the given application, so that the optical signals can be readily transmitted across the gaps G1 and G2 and achieve sufficient edge coupling. As is known in the art, the loss in optical signal energy at the gaps G1 and G2 is a function of the width of the gaps G1 and G2, and the Y and/or Z misalignment between the end portions of the integrated waveguides on the first and second chips 110 and 120. Indeed, gaps and misalignments on the order of one micrometer or more can induce significant optical signal losses on the order of 2× to 10× (or 3 dB to 10 dB), which degrades overall performance.

To minimize the size of the gaps G1 and G2, costly manufacturing techniques must be utilized to form (via etching) the cavity region 116 in the first chip 110 and to form the second chip 120 with tight dimensional tolerances that ensure proper alignment of the chips 110 and 120. In other words, the first and second chips 110 and 120 must be fabricated with matching sizes within a given tolerance, so that the second chip 120 can be properly mounted within the cavity 116 of the first chip 110 with proper gap sizes G1 and G2, which can be problematic on various levels. For example, the second chip 120 is formed on a semiconductor wafer with a plurality of other chips, separated from the wafer using standard wafer dicing methods. However, when dicing a wafer into a plurality of similar chips using standard manufacturing equipment and techniques, there can be variations in the size of the diced chips (dies) in a range of +/−15 microns.

In this regard, with the package structure 100 of FIG. 1, the second chip 120 must be fabricated using high-precision dicing and polishing techniques to ensure that the second chip 120 is properly dimensioned to not only fit within the cavity 116, but to snuggly fit within the cavity 116 such that the gap sizes G1 and G1 are sufficiently small to ensure proper wave signal coupling. Moreover, when using high speed pick and place tools for chip package assembly, there can be variations in the initial chip (die) placement in a range of +/−10 microns. The variations in device fabrication, chip size, and chip assembly, etc., make it difficult to achieve proper gapping and waveguide alignment for the chips 110 and 120 of the package structure 100 in FIG. 1. In this regard, constructing the package structure 100 can be complicated and costly due to the expensive high-precision equipment and time-consuming fabrication techniques that are needed to achieve proper XYZ alignment.

To realize higher performance and lower costs for manufacturing and assembly of package structures for, e.g., photonics applications, embodiments of the invention provide package structures and methods for coupling microelectronic, photonic and optoelectronic devices using single edge coupling of chips with integrated waveguide structures to facilitate wave-coupling and alignment between the integrated waveguide structures of edge-coupled chips. Various package structures using single edge coupling of chips will now be explained in further detail with reference to FIGS. 2-8. In the exemplary package structures discussed below, all signal I/O between two edge-coupled chips occur at a single edge-coupled interface between the chips. The single edge coupling techniques achieve higher performance and lower costs for manufacturing and assembly, as compared to a conventional multi-edge coupling technique, such as shown in FIG. 1.

In particular, FIG. 2 schematically illustrates a package structure 200 which implements single edge coupling of chips with integrated waveguides, according to an embodiment of the invention. The package structure 200 comprises a first chip 210 and a second chip 220. The first chip 210 comprises a first integrated waveguide 212 and a second integrated waveguide 214. The second chip 220 comprises a U-shaped integrated waveguide 221 comprising a first (input) waveguide portion 222, a second (output) waveguide portion 224, and a third waveguide portion 223. The first and second integrated waveguides 212 and 214 of the first chip 210 have end portions disposed at a critical edge E1 of the first chip 210, and the input and output waveguide portions 222 and 224 of the U-shaped integrated waveguide 221 have end portions disposed at a critical edge E2 of the second chip 210. The third waveguide portion 223 is disposed within an active region 225 of the second chip 220. It is to be understood that the various components (e.g., the first and second chips 210 and 220, the integrated waveguides 212, 214 and 221, and the active region 225) of the package structure 200 can be formed of the same or similar materials, structures, and optical signal processing circuitry as in other embodiments discussed above.

With the package structure 200 of FIG. 2, a 3-D alignment process (XYZ alignment) is performed to enable single edge coupling of the critical edges E1 and E2 of the first and second chips 210 and 220 so that a wave signal (e.g., optical signal) propagating in the first integrated waveguide 212 of the first chip 210 can be sufficiently coupled to an input end of the integrated waveguide portion 222 of the second chip 220, and propagate along the U-shaped integrated waveguide 221 for processing in the active region 225, and then output to the first chip 210 by coupling the processed signal from an output end of the integrated waveguide 224 to an input of the second integrated waveguide 214 of the first chip 210 (in FIG. 2, the direction of wave propagation is illustrated by arrows in the integrated waveguides 212, 214, and 221). The 3-D alignment process can be implemented using various techniques.

In one embodiment, XYZ alignment can be performed using the alignment techniques disclosed in U.S. Pat. No. 9,606,308, entitled "Three Dimensional Self-Alignment of Flip Chip Assembly Using Solder Surface Tension During Solder Reflow," which is commonly assigned and fully incorporated herein by reference. U.S. Pat. No. 9,606,308 discloses techniques for assembly and packaging of microelectronic, photonics and optoelectronic devices in which three-dimensional alignment of package components is achieved using solder surface tension during a solder reflow process to move one or more package components and align such components in X, Y and Z directions using mechanical stops and chip butting (edge coupling) techniques. The techniques disclosed in U.S. Pat. No. 9,606,308 can be implemented to align the first and second chips 210 and 220 in a manner in which the critical edges E1 and E2 are disposed in contact with each other, such that there is no gap (i.e., gap size G=0) between the critical edges E1 and E2 (i.e., there is no gap between the aligned ends of the integrated waveguides 212 and 222, and no gap between the aligned ends of the integrated waveguides 214 and 224).

In another embodiment, the single edge coupling of the critical edges E1 and E2 of the first and second chips 210 and 220 can be performed using an epoxy and a robotic XYZ alignment system. With this process, an epoxy glue can be disposed on one or both of the critical edges E1 and E2 of the first and second chips 210 and 220, and a robotic system can place the first and second chips 210 and 220 in position with the critical edges E1 and E2 placed in contact to each other at some predetermined gap distance G which ensures that some thickness of epoxy glue remains between the critical edges E1 and E2 to enable bonding. A 3D (XYZ) alignment process can be performed by transmitting light signals through the integrated waveguides of the first and second chips 210 and 220 and monitoring the intensity of the light that is transmitted from the first integrated waveguide 212, through the U-shaped integrated waveguide 221, and out to the second integrated waveguide 214. While monitoring the light intensity, the robotic system can slightly adjust the position of the second chip 220, for example, in the Y and Z directions until a target X Y position is reached where the light intensity in the output waveguide 214 is maximized. At that point, the epoxy glue can be cured by exposing the epoxy glue to ultraviolet light, for example, using known techniques. It is to be understood that the exemplary assembly techniques discussed above can also be implemented for single edge coupling of chips in the package structures shown in FIGS. 3-8.

The single edge coupling of the package structure 200 of FIG. 2 alleviates much of the manufacturing and placement tolerances and costs, as compared to the multi-edge coupling in the package structure 100 of FIG. 1. Indeed, in the package structure of FIG. 2, no strict tolerance is needed on the dimensions of the first and second chips 210 and 220 as the alignment (e.g., X-direction alignment) between the first and second chips 210 and 220 is performed between a single edge (E1 and E2) of each chip 210 and 220. In this regard, the gap G between the critical edges E1 and E2 of the first and second chips 210 and 220 can be made very small, e.g., less than 0.1 micron, wherein placing and sliding the chips 210 and 220 into contact at the critical edges E1 and E2 relaxes the assembly constraints and facilitates the ease of the X-direction alignment.

In addition, the single edge coupling between the critical edges E1 and E2 serves to relax the constraints for the Y-direction and Z-direction alignment. For example, as shown in FIG. 2, the spacing S1 between the first and second integrated waveguides 212 and 214 on the first chip 210, and the spacing S2 between the first and second integrated waveguide portions 222 and 224 on the second chip 220 can be tightly controlled as the spacings S1 and S2 between the integrated waveguides are determined using lithography, which is extremely accurate. In this regard, since the integrated waveguide structures are formed using lithography techniques, the dimensions of the integrated waveguides (e.g., cross-sectional area), and the spacings S and S2 on each of the chips 210 and 220 can be fabricated to be substantially the same, thereby facilitating and enhancing alignment capability in the Y and Z directions. As such, the I/O optical signal coupling between the single edged coupled chips 210 and 220 can be optimal.

The U-shaped waveguide 221 on the second chip 220 requires waveguide bending turns (e.g., the bending portions connecting the third waveguide portion 223 to the first and second waveguide portions 222 and 224). In several materials of interest (III-V semiconductors, LiNb material), the bending turns must be wide (hundreds of micrometers) because the wave indices (optical indices) are small, or the difference of indices between the waveguide and the cladding material is small. For example, with LiNB waveguides, the minimum radius of curvature (ROC) of the bends is about 7 mm, which forces the spacings S1 and S2 between the I/O portions of the integrated waveguides on the first and second chips 210 and 220 to be relatively large. In this regard, the footprint size of second chip 220 (e.g., OE chip) must be relatively large, e.g., on the order of millimeters or centimeters, in order to accommodate the low bending radii for the U-shaped waveguide 221. This is not practical for typical OE chips which are designed to have sizes that are less than 1 mm.

Embodiments of the invention shown in FIGS. 3-8 provide solutions to implement single edge coupling while minimize the size of the OE chip (typically smaller than a millimeter). The example embodiments of FIGS. 3-8 include package structures in which at least one of the edge-coupled chips (e.g., OE chip) implements a signal reflection structure which allows an optical signal propagating in a first (input) integrated waveguide on the chip to be returned in a second (output) integrated waveguide on the chip, such that the spacing between the input and output waveguides on each of the single edge coupled chips can be formed in close proximity to each other.

Figure 3:
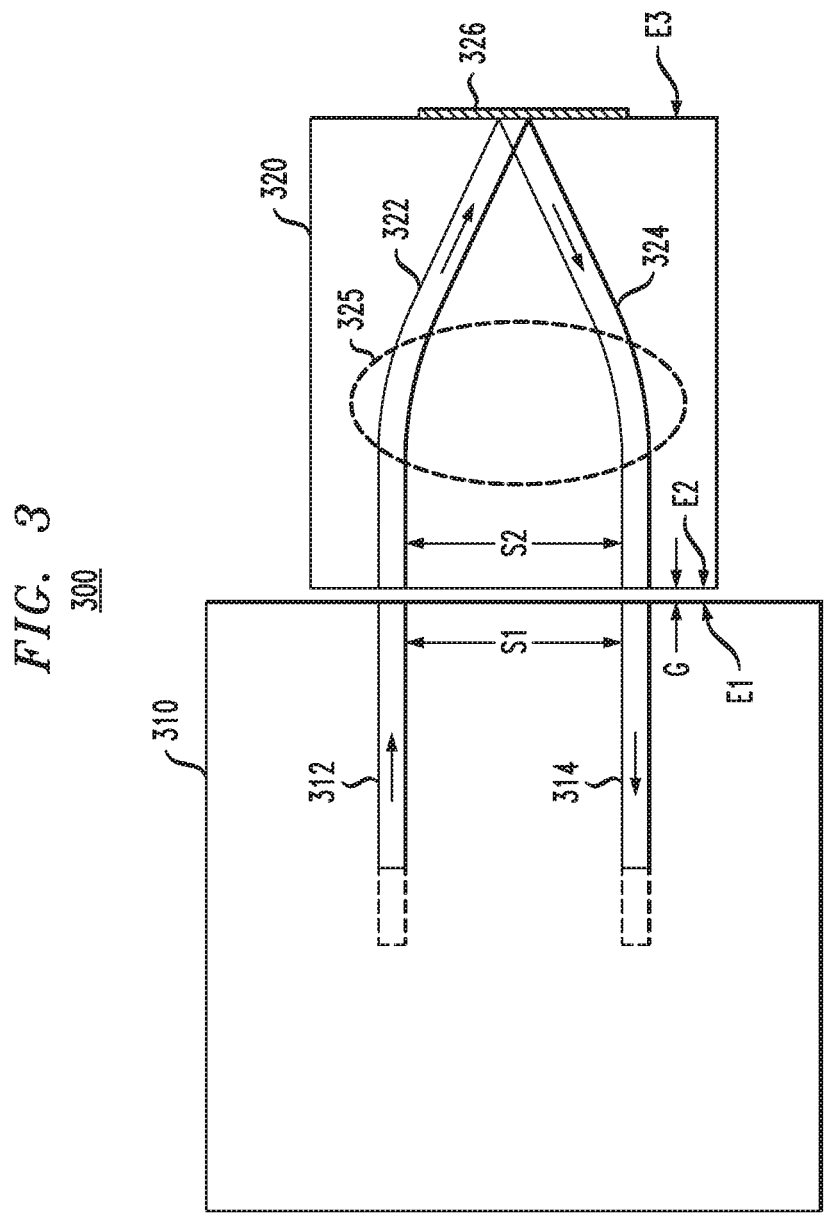
FIG. 3 schematically illustrates a package structure which implements single edge coupling of chips with integrated waveguides, according to another embodiment of the invention.

For example, FIG. 3 schematically illustrates a package structure 300 which implements single edge coupling of chips with integrated waveguides, according to an embodiment of the invention in which an optical signal reflection structure is implemented on the OE chip. In particular, as shown in FIG. 3, the package structure 300 comprises a first chip 310 and a second chip 320. The first chip 310 comprises a first integrated waveguide 312 and a second integrated waveguide 314 separated by a spacing S1. The second chip 320 comprises a first (input) integrated waveguide 322, a second (output) integrated waveguide 324, and an active region 325. The first and second integrated waveguides 312 and 314 of the first chip 310 have end portions disposed at a critical edge E1 of the first chip 310, and the input and output integrated waveguides 322 and 324 have end portions disposed at a critical edge E2 of the second chip 320. In addition, the I/O ends of the integrated waveguides 322 and 324 are spaced by a distance S2, which is equal to S1. It is to be understood that the various components of the package structure 300 can be formed of the same or similar materials, structures, and optical signal processing circuitry as in other embodiments discussed above.

As further shown in FIG. 3, the integrated waveguides 322 and 324 on the second chip 320 have bending profiles such that end potions of the integrated waveguides 322 and 324 converge at an edge E3 of the second chip 320. A reflective coating 326 is disposed on the edge E3 of the second chip 320. The reflective coating 326 is formed of a highly-reflective, thin coating of dielectric material (e.g., magnesium fluoride, calcium fluoride, etc.) which has an index of refraction which is different from the index of refraction of the material used to form the integrated waveguides 322 and 324. The reflective coating 326 can be formed of two or more layers of different types of dielectric material to optimize reflections for optical signals with different operating wavelengths. The reflective coating 326 on the edge E3 of the second chip 320 is configured to reflect an optical signal from the first integrated waveguide 322 into the second integrated waveguide 324 (at the converging ends of the integrated waveguides 322 and 324) so that the optical signal can propagate in the second integrated waveguide 324 of the second chip 320, and be returned to the second integrated waveguide 314 of the first chip 310. This embodiment eliminates/relaxes the ROC size requirement of the U-shaped waveguide 221 in the embodiment of FIG. 2, which allows the spacing S1 and S2 to be relatively smaller and, thus, allows the chip footprints to be relatively smaller. For example, the spacing S1 and S2 can be on order of 10's of microns or less, and the length of the second chip 320 can be less than a fraction of 1 mm.

FIG. 3 illustrates an example embodiment in which the reflecting edge E3 is a physical edge of the second chip 320.

However, in an alternate embodiment, the reflecting edge E3 may comprise an internal edge (e.g., discontinuity) which is formed by etching a hole or cavity within the second chip 320 at the converging ends of the integrated waveguides 322 and 324. The vertical sidewalls of the etched hole or cavity can be coated with a highly-reflective, thin coating of dielectric material to form a reflective coating (similar to the reflective coating 326 shown in FIG. 3). In this manner, the reflecting edge (as provided by the etched hole or cavity) could be disposed in any suitable area of the second chip 320, so that the length of the integrated waveguides 322 and 324 can be decoupled from, and not dependent on, the size of the second chip 320.

In another embodiment, instead of utilizing the reflective coating 326 on the edge E3 of the second chip 320, a Total Internal Reflection (TIR) mechanism can be implemented to cause reflection of the optical signal at the converging ends of the integrated waveguides 322 and 324 via TIR of the signal at the edge E3 of the second chip 320. In this configuration, the converging ends of the first and second integrated waveguides 322 and 324 at the edge E3 of the second chip 320 are disposed at no less than some minimum angle (e.g., 90 degrees) to effectuate TIR and reflection of the optical signal from the first integrated waveguide 322 into the second integrated waveguide 324. The minimum angle will vary depending on the materials of the integrated waveguides and the propagating modes of the optical signals, as is understood by one of ordinary skill in the art. Since the minimum angle between the converging ends of the first and second integrated waveguides 322 and 324 is relatively wide (often on the order of 90 degrees), this configuration can result in an increase in the size of the second chip 320 (e.g., OE chip), as compared to using the reflective coating 326 (which relaxes the minimum angle requirement associated with TIR).

Figure 4:
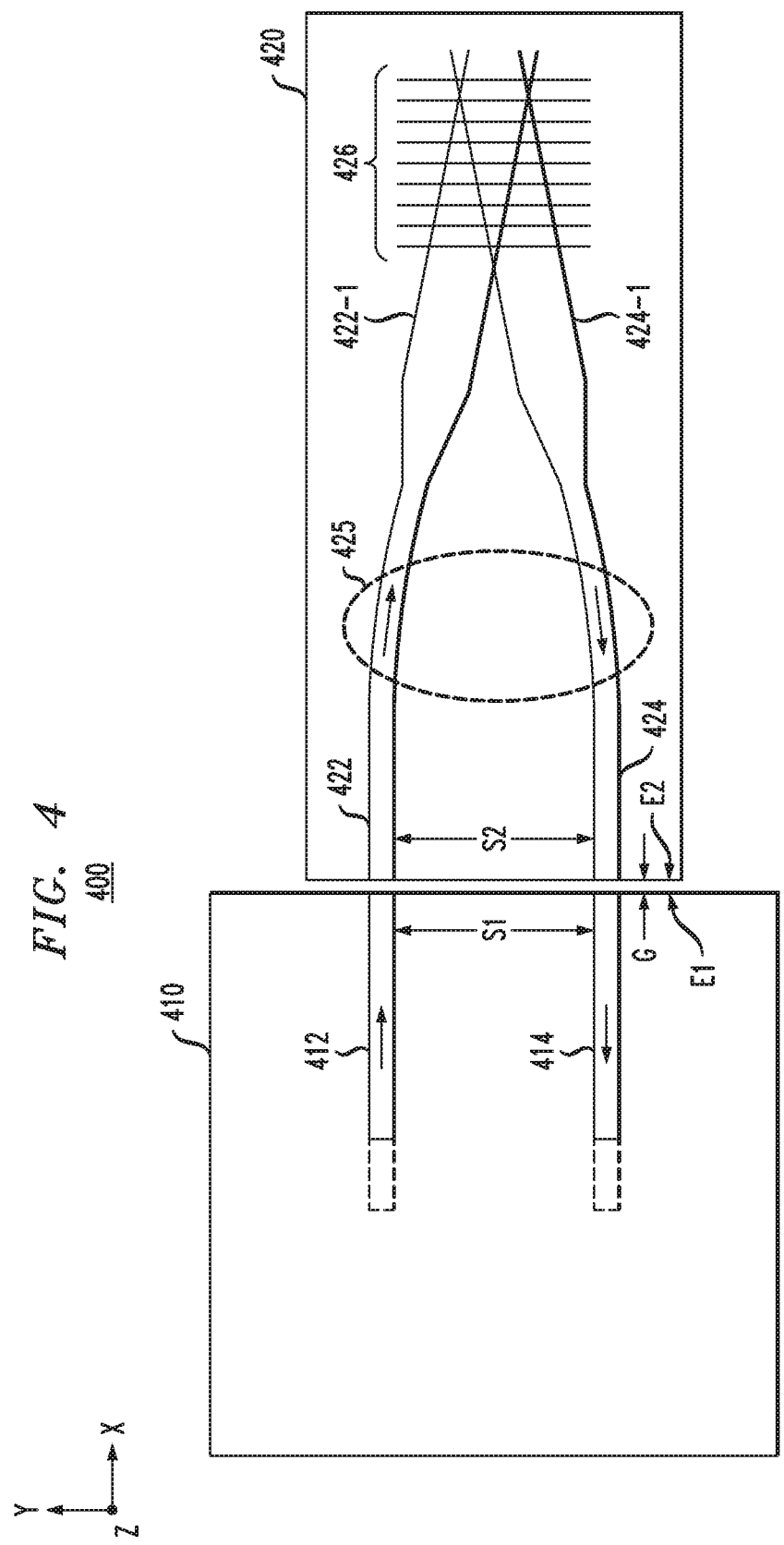
FIG. 4 schematically illustrates a package structure which implements single edge coupling of chips with integrated waveguides, according to another embodiment of the invention.

An alternative embodiment for the reflective element makes use of a Bragg grating as a reflector instead of a discontinuity (e.g., reflective coating or TIR). For example, FIG. 4 schematically illustrates a package structure 400 which implements single edge coupling of chips with integrated waveguides, according to an embodiment of the invention in which a reflection mechanism is implemented using a Bragg reflector. In particular, as shown in FIG. 4, the package structure 400 comprises a first chip 410 and a second chip 420. The first chip 410 comprises a first integrated waveguide 412 and a second integrated waveguide 414 separated by a spacing S1. The second chip 420 comprises a first (input) integrated waveguide 422 and a second (output) integrated waveguide 424, which pass through an active region 425. The first and second integrated waveguides 412 and 414 of the first chip 410 have end portions disposed at a critical edge E1 of the first chip 410, and the input and output integrated waveguides 422 and 424 of the second chip 420 have end portions disposed at a critical edge E2 of the second chip 410. It is to be understood that the various components of the package structure 400 can be formed of the same or similar materials, structures, and optical signal processing circuitry as in other embodiments discussed above.

As further shown in FIG. 4, the first integrated waveguide 422 and the second integrated waveguide 424 of the second chip 420 have widened portions 422-1 and 424-1 which interface with a Bragg reflector 426 formed on the second chip 420. The Bragg reflector 426 serves as a distributed reflector, wherein each dashed line shown in FIG. 4 denotes a partial reflector. Each partial reflector can be a groove that is formed in the semiconductor material, or a separate thin wire/line of material that acts as a partial reflector. The Bragg reflector 426 acts as a reflector for parallel optical beams propagating in the waveguides. The partial reflectors (dashed lines) of the Bragg reflector 426 are disposed adjacent to each other as at a given periodicity such that each partial reflector reflects a portion of the optical beam, and all reflected portions of the optical signal are coherent and in-phase and, thus, constructively interfere to provide substantially the same incident optical signal at the input of the Bragg reflector 426.

As is known in the art, to implement sufficient reflection, a low numerical aperture (NA) wide mode is desired (NA angle<10 degrees) for efficient reflection and coupling into the return waveguide 424, and minimizing back-reflection. In the example embodiment of FIG. 4, this is achieved by widened portions 422-1 and 424-1 of the integrated waveguides 422 and 424 (over a small length (100 um)) near the input and output of the Bragg reflector 426. The widened waveguide regions 422-1 and 424-1 serve to produce optical modes with low numerical aperture (e.g., producing more parallel beams of light).

Figure 5:
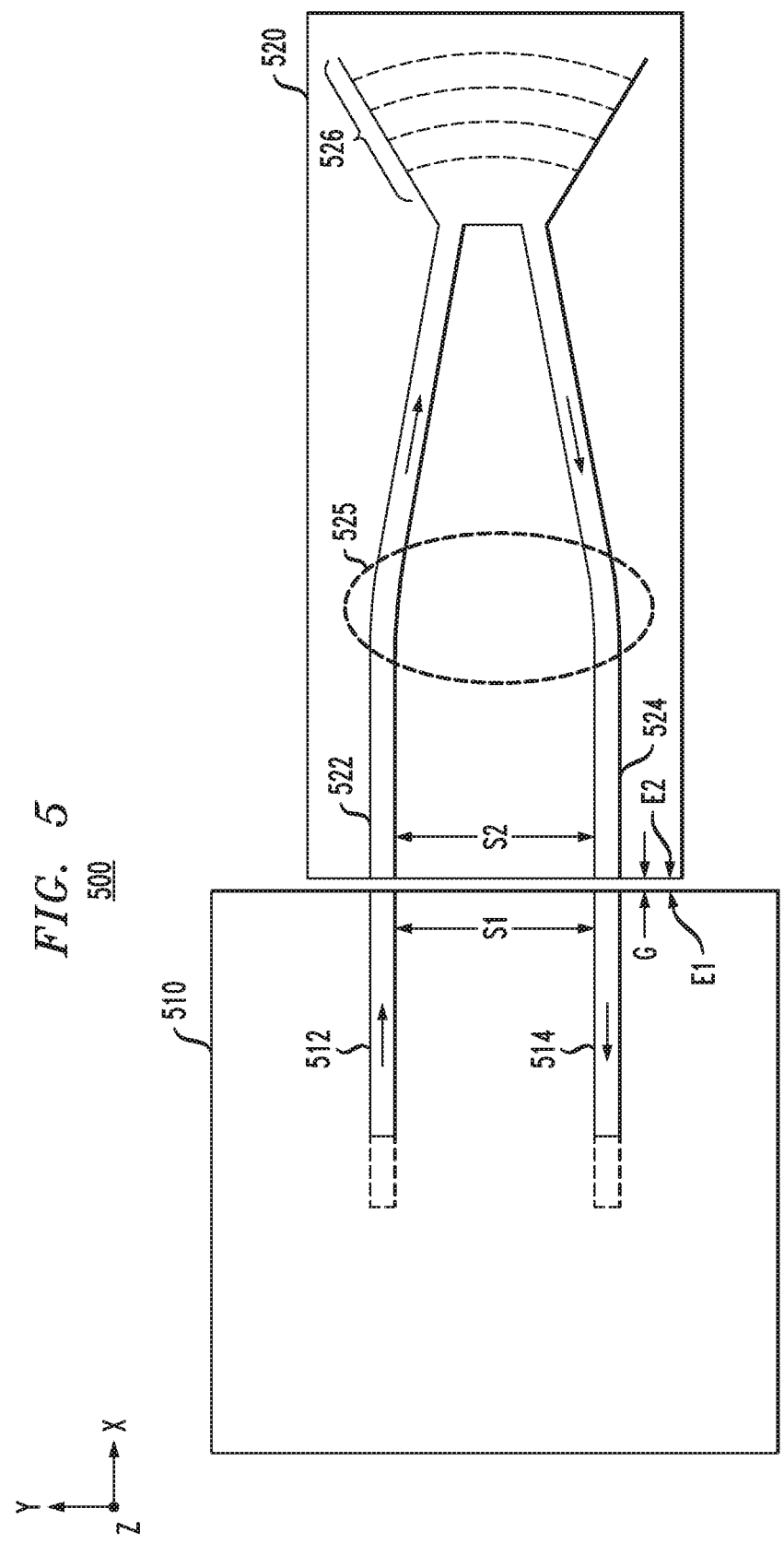
FIG. 5 schematically illustrates a package structure which implements single edge coupling of chips with integrated waveguides, according to another embodiment of the invention.

FIG. 5 schematically illustrates a package structure 500 which implements single edge coupling of chips with integrated waveguides, according to an embodiment of the invention in which a reflection mechanism is implemented using a Bragg reflector. In particular, as shown in FIG. 5, the package structure 500 comprises a first chip 510 and a second chip 520. The first chip 510 comprises a first integrated waveguide 512 and a second integrated waveguide 514 separated by a spacing S1. The second chip 520 comprises a first (input) integrated waveguide 522, and a second (output) integrated waveguide 524, which pass through an active region 525. The first and second integrated waveguides 512 and 514 of the first chip 510 have end portions disposed at a critical edge E1 of the first chip 510, and the input and output integrated waveguides 522 and 524 have end portions disposed at a critical edge E2 of the second chip 520. It is to be understood that the various components of the package structure 500 can be formed of the same or similar materials, structures, and optical signal processing circuitry as in other embodiments discussed above.

In addition, the first integrated waveguide 522 and the second integrated waveguide 524 of the second chip 520 have converging portions which interface with a curve-shaped Bragg reflector 526 formed on the second chip 520. The Bragg reflector 526 serves as a distributed reflector, wherein each curved dashed line shown in FIG. 5 denotes a partial reflector. Each partial reflector can be a groove that is formed in the semiconductor material, or a separate thin wire/line of material that acts as a partial reflector. In this embodiment, the input waveguide 522 and the output waveguide 524 are more physically separated as compared to the embodiment of FIG. 4 wherein the input/output waveguide portions of the Bragg reflector 426 which converge into direct contact ("X" configuration). The configuration of the curved Bragg reflector 526 serves to minimize undesirable back-reflections into the input waveguide, wherein the curved reflectors are designed to refocus the incoming spreading wave-front into the outgoing waveguide, for better efficiency.

Figure 6:
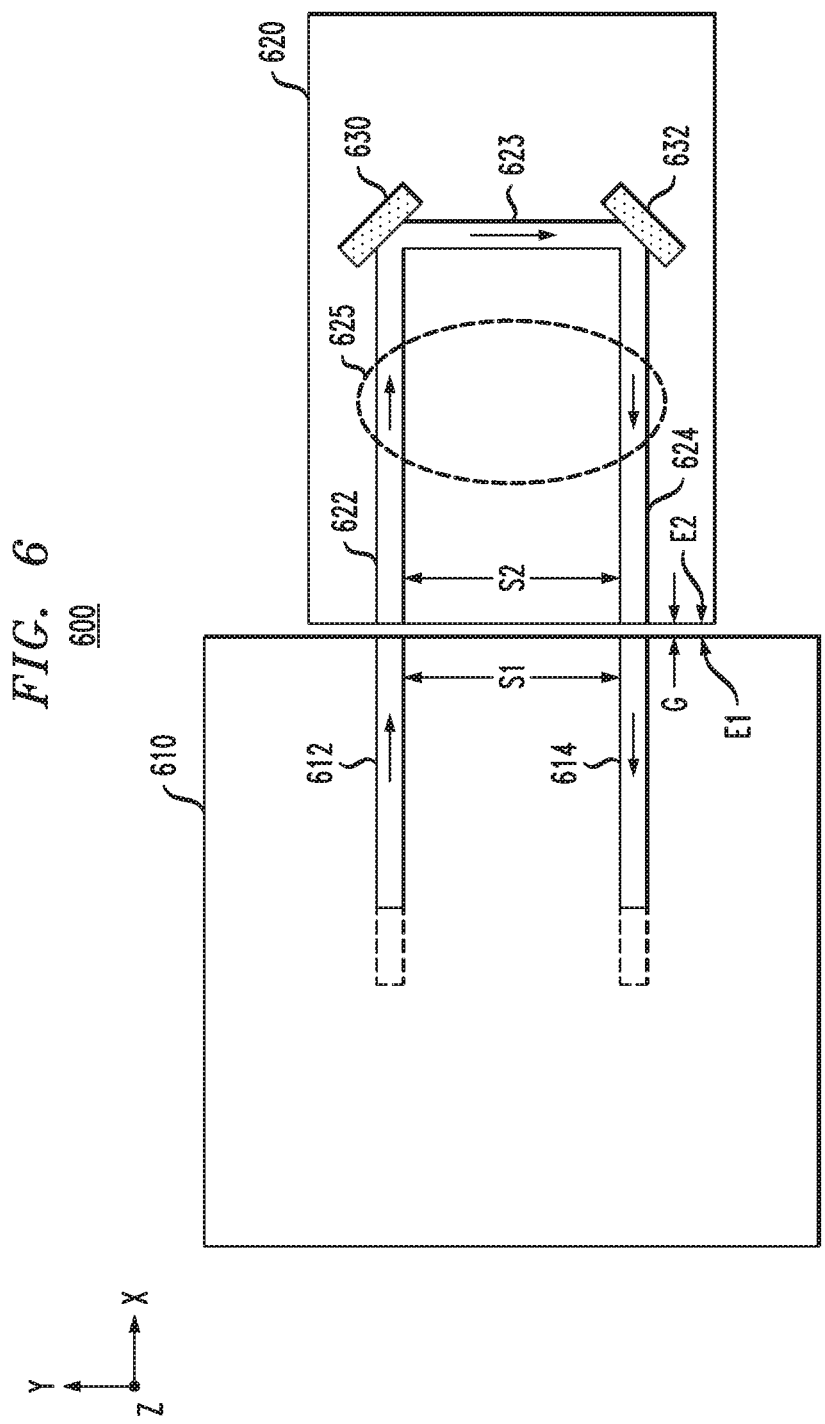
FIG. 6 schematically illustrates a package structure which implements single edge coupling of chips with integrated waveguides, according to another embodiment of the invention.

FIG. 6 schematically illustrates a package structure 600 which implements single edge coupling of chips with integrated waveguides, according to an embodiment of the invention, in which a dual-reflection mechanism is implemented to allow an optical signal to be input in a first integrated waveguide and returned in a second integrated waveguide that is disposed in close proximity to the first integrated waveguide. The package structure 600 comprises a first chip 610 and a second chip 620. The first chip 610 comprises a first integrated waveguide 612 and a second integrated waveguide 614 separated by a spacing S1. The second chip 620 comprises a first (input) integrated waveguide 622 and a second (output) integrated waveguide 624, which pass through an active region 625. The first and second integrated waveguides 612 and 614 of the first chip 610 have end portions disposed at a critical edge E1 of the first chip 610, and the input and output integrated waveguides 622 and 624 have end portions disposed at a critical edge E2 of the second chip 620.

In addition, the second chip 620 comprises a first reflector element 630 and a second reflector element 632, and an integrated waveguide 623 disposed between the reflector elements 630 and 632. In the exemplary embodiment of FIG. 6, an end portion of the first integrated waveguide 622 is coupled to one end of the integrated waveguide 623, and an end portion of the second integrated waveguide 624 is coupled to another end of the integrated waveguide 623. The first and second reflector elements 630 and 632 may be cavities that are etched into the surface of the second chip 620 to provide air interfaces (discontinuities) that allow optical signals to be reflected using TIR. In other embodiments, the reflector elements 630 and 632 can be formed by etching cavities in the surface of the second chip, and then coating the cavity sidewalls with a reflective coating. It is to be understood that the various components of the package structure 600 can be formed of the same or similar materials, structures, and optical signal processing circuitry as in other embodiments discussed above.

The embodiment of FIG. 6 with the dual reflector elements 630 and 632 allows the spacing S1 and S2 between the I/O portions of the integrated waveguides to be extremely small (on the order of 10's of microns or less) since the angle between incident and reflected beams can be on the order of 90 degrees for each reflector. In other embodiments, more than two reflector elements can be utilized in conjunction with waveguide bends on the second chip 620. In all embodiment, the aim and benefit is to provide a small spacing S1 and S2 between the I/O waveguide pairs that are coupled across the critical edges E1 and E2 between the two chips 610 and 620, and thereby to minimize the overall dimensions of the second (OE) chip 620.

Figure 7:
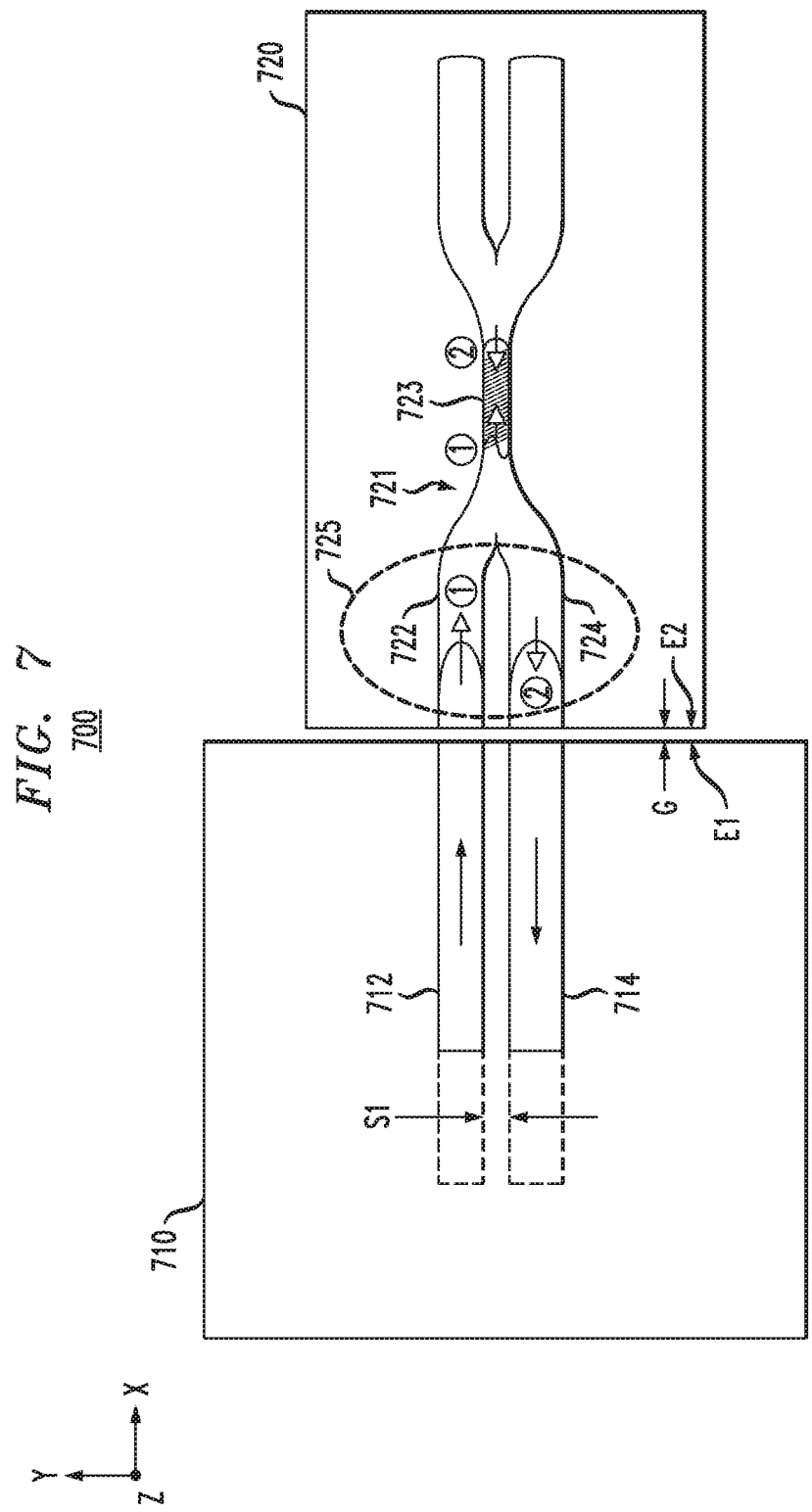
FIG. 7 schematically illustrates a package structure which implements single edge coupling of chips with integrated waveguides, according to another embodiment of the invention.

FIG. 7 schematically illustrates a package structure 700 which implements single edge coupling of chips with integrated waveguides, according to an embodiment of the invention in which a reflection mechanism is implemented using contra-directional add-drop filter ("Arroyo coupler"). In particular, as shown in FIG. 7, the package structure 700 comprises a first chip 710 and a second chip 720. The first chip 710 comprises a first integrated waveguide 712 and a second integrated waveguide 714 separated by a spacing S1. The second chip 720 comprises a contra-directional add-drop filter 721 (or Arroyo coupler) comprising a first (input) integrated waveguide portion 722, a reflector portion 723, and a second (output) integrated waveguide portion 724, wherein the first and second integrated waveguide portions 722 and 724 pass through an active region 725. The first and second integrated waveguides 712 and 714 of the first chip 710 have end portions disposed at a critical edge E1 of the first chip 710, and the input and output integrated waveguide portions 722 and 724 of the Arroyo coupler 721 have end portions disposed at a critical edge E2 of the second chip 720. It is to be understood that the various components of the package structure 700 can be formed of the same or similar materials, structures, and optical signal processing circuitry as in other embodiments discussed above.

The functions and operating modes of the add-drop filter 721 are well known in the art, as described in the publication by Kewitsch, et al., "All-Fiber Zero-Insertion-Loss Add-Drop Filter for Wavelength-Division Multiplexing," OPTICS LETTERS, Vol. 23, No. 2, Jan. 15, 1998, which is incorporated herein by reference. The input and output integrated waveguide portions 722 and 724 converge to a common path of the coupler 721. The reflector portion 723 of the Arroyo coupler 721 comprises a Bragg grating that is fabricated over (or near) the common path. The Arroyo coupler 721 is asymmetric, whereby the input and output waveguides are optimized for different wave modes and therefore some of the return waveguide (of the second (OE) chip 720 and/or the first chip 710 (e.g., photonics chip) must operate on a different wave mode (typically, the lateral size or spread of the reflected wave is different than the size of incoming wave).

Figure 8:
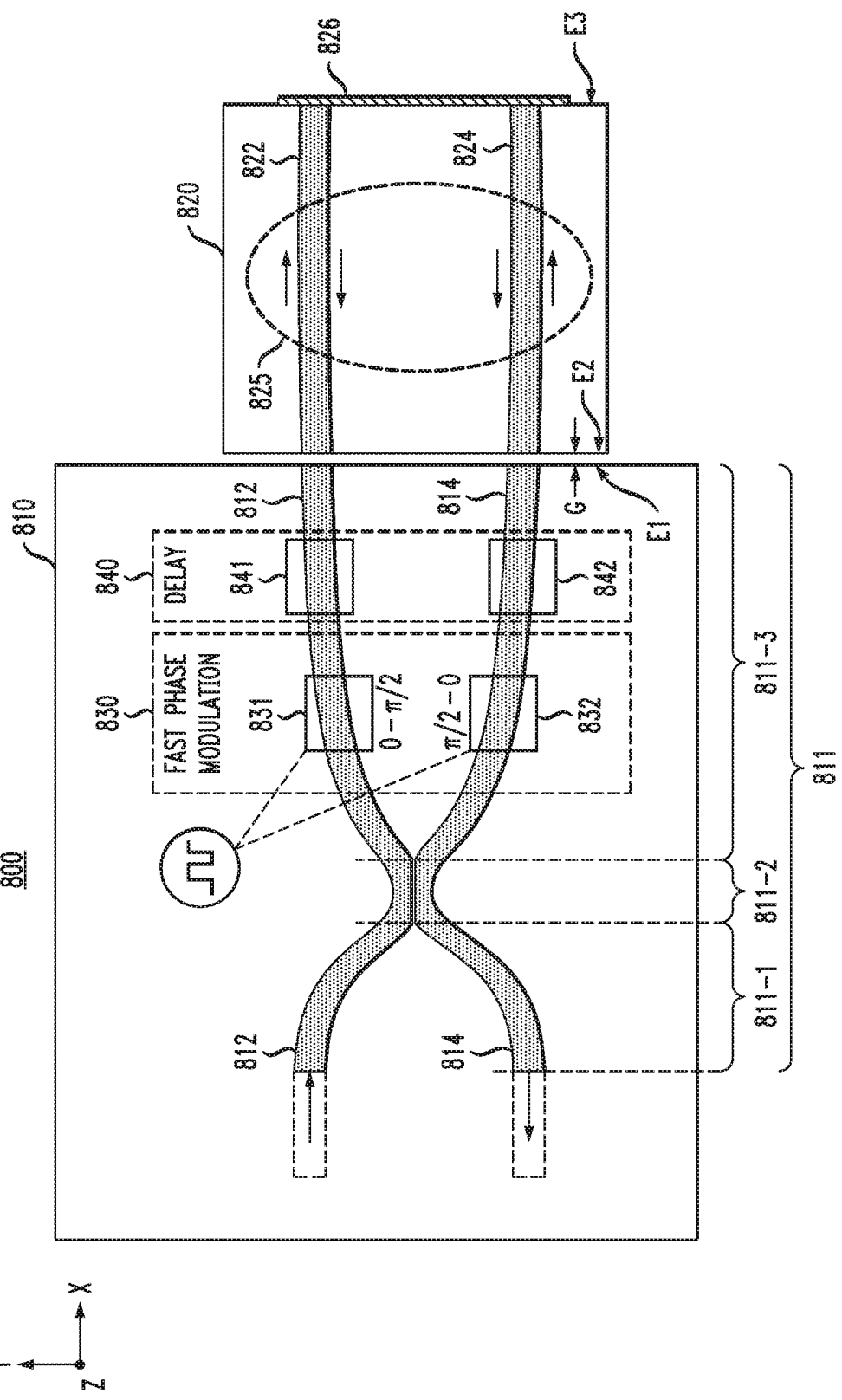
FIG. 8 schematically illustrates a package structure which implements single edge coupling of chips with integrated waveguides, according to another embodiment.

FIG. 8 schematically illustrates a package structure 800 which implements single edge coupling of chips with integrated waveguides, according to an embodiment of the invention in which a reflection mechanism is implemented using adiabatic coupler/combiner and phase control. In particular, as shown in FIG. 8, the package structure 800 comprises a first chip 810 and a second chip 820. The first chip 810 comprises an adiabatic coupler 811 (e.g., 50/50 adiabatic coupler) comprising a first integrated waveguide 812 and a second integrated waveguide 814, wherein the first and second waveguides 812 and 814 have the same widths W1 and W2, or different widths W1 and W2, wherein W2 is greater than W1. The adiabatic coupler 811 comprises three sections 811-1, 811-2, and 811-3. In the first section 811-1, the first and second integrated waveguides 812 and 814 converge towards each other through S-bends. The second section 811-2 comprises a "coupling section" in which the two (e.g., asymmetric) integrated waveguides 812 and 814 are linearly tapered equal width waveguides that are disposed adjacent to each other in close proximity. In the third section, the first and second integrated waveguides 812 and 814 (of equal width) diverge away from each other by S-bends and terminate at the critical edge E1 of the first chip 810, where they are separated by a spacing S1.

The first chip 810 further comprises fast phase modulation circuitry 830 and delay circuitry 840. The fast phase modulation circuitry 830 comprises first and second phase modulator devices 831 and 832 integrally coupled to the first and second integrated waveguides 812 and 814 in the third section 811-3 of the adiabatic coupler 811. The delay circuitry 840 (which is optional) comprises first and second delay elements 841 and 842 integrally coupled to the first and second integrated waveguides 812 and 814, respectively, in the third section 811-3 of the adiabatic coupler 811.

The second chip 820 comprises a first integrated waveguide 822 and a second integrated waveguide 824, which pass through an active region 825. The first and second integrated waveguides 822 and 824 have end portions disposed at a critical edge E2 of the second chip 820 and opposing end portions disposed at a reflecting edge E3 of the second chip 820. In one embodiment, a reflective coating 826 is applied to the reflecting edge E3 of the second chip 820. It is to be understood that the various components of the package structure 800 can be formed of the same or similar materials, structures, and optical signal processing circuitry as in other embodiments discussed above.

FIG. 8 illustrates an example embodiment based on active phase control or switching following the 50/50 adiabatic coupler 811 in the first chip 810 (photonic wave circuit). As shown by the directional arrows in the integrated waveguides of FIG. 8, an optical signal is input to the first integrated waveguide 812 (first Port) in the first section 811-1 of the adiabatic coupler 811 on the first chip 810. The input optical signal propagates to the coupling section 811-2 of the adiabatic coupler 811 and is split into two optical signals that propagate in the portions of the first and second integrated waveguides 812 and 814 (second and third Ports) in the third section 811-3 towards the critical edge E1 of the first chip 810. The input optical signals undergo a time dependent phase modulation by operation of the phase modulation elements 831 and 832 (and optional delay elements 841 and 842). In one embodiment, the phase modulation operations are configured so that a phase difference is 180 degrees when the optical signals return to the coupler section 811-2, which results in constructive interference of the two optical signals, to generate an output optical signal which is output to (and propagates along) the second integrated waveguide 814 ($4^{th}$ port of the coupler) in the first section 811-1 of the adiabatic coupler 811.

FIG. 8 provides an exemplary embodiment in which the first and second integrated waveguides 822 and 824 in the second chip 820 are not coupled to each other. Instead, optical signals that are input-coupled to the first and second integrated waveguides 822 and 824 (from the first and second integrated waveguides 812 and 814 on the first chip 810) will propagate along the first and second integrated waveguides 822 and 824 through the active region 825. The optical signals are then reflected back by the reflective coating 826 at the edge E3 of the second chip 820, and propagate back along the first and second integrated waveguides 822 and 824 to the critical edge E2 of the second chip 820, where the reflected signals are then coupled back to the end portions of the first and second integrated waveguides 812 and 814 at the critical edge E1 of the first chip 810. In this regard, there is bi-directional propagation of optical signals in the first and second integrated waveguides 822 and 824 in the second chip 820, as well as bi-directional propagation of optical signals in the portions of the first and second integrated waveguides 812 and 814 in the third section 811-3 of adiabatic coupler 811.

Although the example embodiments in FIGS. 2-8 schematically illustrate the waveguide angles at the chip edges E1 and E2 to be 90 degrees, the angles of the integrated waveguides at the critical edges E1 and E2 can made to vary, e.g., between 90+/−7 degrees to 90+/−15. The angles between the integrated waveguides and the critical edges E1 and E2 can be selected to minimize optical back-reflections.

Although exemplary embodiments have been described herein with reference to the accompanying drawings for purposes of illustration, it is to be understood that the present invention is not limited to those precise embodiments, and that various other changes and modifications may be affected herein by one skilled in the art without departing from the scope of the invention.

We claim:

1. A package structure comprising:
   a first chip comprising a first critical edge, a first integrated waveguide, and a second integrated waveguide, wherein the first and second integrated waveguides of the first chip each comprise an end portion that terminates on the first critical edge of the first chip;
   a second chip comprising a second critical edge, a first integrated waveguide, a second integrated waveguide, and a signal reflection structure, wherein the first and second integrated waveguides of the second chip each comprise an end portion that terminates on the second critical edge of the second chip, and an end portion that is coupled to the signal reflection structure, wherein the signal reflection structure is configured to reflect an optical signal propagating in at least one of the first and second integrated waveguides of the second chip;
   wherein the first and second chips are edge-coupled at the first and second critical edges such that the end portions of the first integrated waveguides of the first and second chips are aligned to each other, and the end portions of the second integrated waveguides of the first and second chips are aligned to each other;
   wherein the signal reflection structure comprises a discontinuity in the first and second integrated waveguides of the second chip, wherein the discontinuity is configured to reflect an optical signal propagating in the first integrated waveguide of the second chip into the second integrated waveguide of the second chip;
   wherein the discontinuity comprises a cavity etched in a surface of the second chip to form a vertical wall, wherein the first and second integrated waveguides of the second chip have end portions that terminate at the vertical wall of the cavity; and
   a reflective coating disposed on the vertical wall of the cavity etched in the surface of the second chip, wherein the reflective coating is configured to increase a signal reflectivity of the vertical wall.

2. The package structure of claim 1, wherein the second chip comprises an optoelectronics chip with optical signal processing circuitry configured to process an optical signal propagating in at least one of first and second integrated waveguides of the second chip.

3. The package structure of claim 2, wherein the optical signal processing circuitry comprises at least one of a semiconductor optical amplifier, an optoelectronic modulator, and a wavelength division multiplexer.

4. A package structure comprising:
   a first chip comprising a first critical edge, a first integrated waveguide, and a second integrated waveguide, wherein the first and second integrated waveguides of the first chip each comprise an end portion that terminates on the first critical edge of the first chip;
   a second chip comprising a second critical edge, a first integrated waveguide, a second integrated waveguide, and a signal reflection structure, wherein the first and second integrated waveguides of the second chip each comprise an end portion that terminates on the second critical edge of the second chip, and an end portion that is coupled to the signal reflection structure, wherein the signal reflection structure is configured to reflect an optical signal propagating in at least one of the first and second integrated waveguides of the second chip;
   wherein the first and second chips are edge-coupled at the first and second critical edges such that the end portions of the first integrated waveguides of the first and second chips are aligned to each other, and the end portions of the second integrated waveguides of the first and second chips are aligned to each other;
   wherein the signal reflection structure of the second chip comprises a Bragg reflector structure connected to end portions of the first and second integrated waveguides of the second chip;
   wherein the first integrated waveguide and the second integrated waveguide of the second chip have converging end portions which interface with a curved Bragg grating of the Bragg reflector structure, wherein the curved Bragg grating comprises a plurality of curved partial reflectors arranged adjacent to each other; and wherein the first and second integrated waveguides of the second chip comprise parallel end portions that terminate on the second critical edge of the second chip, wherein the parallel end portions and the converging end portions of the first and second integrated waveguides of the second chip are equal in width.

5. A package structure comprising:
a first chip comprising a first critical edge, a first integrated waveguide, and a second integrated waveguide, wherein the first and second integrated waveguides of the first chip each comprise an end portion that terminates on the first critical edge of the first chip;
a second chip comprising a second critical edge, a first integrated waveguide, a second integrated waveguide, and a signal reflection structure, wherein the first and second integrated waveguides of the second chip each comprise an end portion that terminates on the second critical edge of the second chip, and an end portion that is coupled to the signal reflection structure, wherein the signal reflection structure is configured to reflect an optical signal propagating in at least one of the first and second integrated waveguides of the second chip;
wherein the first and second chips are edge-coupled at the first and second critical edges such that the end portions of the first integrated waveguides of the first and second chips are aligned to each other, and the end portions of the second integrated waveguides of the first and second chips are aligned to each other;
wherein the signal reflection structure of the second chip comprises a Bragg reflector structure connected to end portions of the first and second integrated waveguides of the second chip;
wherein the first integrated waveguide and the second integrated waveguide of the second chip have converging end portions which interface with a non-curved Bragg grating of the Bragg reflector structure, wherein the non-curved Bragg grating comprises a plurality of straight partial reflectors arranged in parallel and adjacent to each other.

6. The package structure of claim 5, wherein the first and second integrated waveguides of the second chip comprise parallel end portions that terminate on the second critical edge of the second chip, wherein the converging end portions of the first and second integrated waveguides are wider than the parallel end portions of the first and second integrated waveguides.

7. A package structure comprising:
a first chip comprising a first critical edge, a first integrated waveguide, and a second integrated waveguide, wherein the first and second integrated waveguides of the first chip each comprise an end portion that terminates on the first critical edge of the first chip;
a second chip comprising a second critical edge, a first integrated waveguide, a second integrated waveguide, and a signal reflection structure, wherein the first and second integrated waveguides of the second chip each comprise an end portion that terminates on the second critical edge of the second chip, and an end portion that is coupled to the signal reflection structure, wherein the signal reflection structure is configured to reflect an optical signal propagating in at least one of the first and second integrated waveguides of the second chip;
wherein the first and second chips are edge-coupled at the first and second critical edges such that the end portions of the first integrated waveguides of the first and second chips are aligned to each other, and the end portions of the second integrated waveguides of the first and second chips are aligned to each other;
wherein the signal reflection structure of the second chip comprises a Bragg reflector structure connected to end portions of the first and second integrated waveguides of the second chip;
wherein the second chip comprises an optoelectronics chip with optical signal processing circuitry configured to process an optical signal propagating in at least one of first and second integrated waveguides of the second chip.

8. The package structure of claim 7, wherein the optical signal processing circuitry comprises at least one of a semiconductor optical amplifier, an optoelectronic modulator, and a wavelength division multiplexer.

9. A package structure comprising:
a first chip comprising a first critical edge, a first integrated waveguide, and a second integrated waveguide, wherein the first and second integrated waveguides of the first chip each comprise an end portion that terminates on the first critical edge of the first chip;
a second chip comprising a second critical edge, a first integrated waveguide, a second integrated waveguide, and a signal reflection structure, wherein the first and second integrated waveguides of the second chip each comprise an end portion that terminates on the second critical edge of the second chip, and an end portion that is coupled to the signal reflection structure, wherein the signal reflection structure is configured to reflect an optical signal propagating in at least one of the first and second integrated waveguides of the second chip;
wherein the first and second chips are edge-coupled at the first and second critical edges such that the end portions of the first integrated waveguides of the first and second chips are aligned to each other, and the end portions of the second integrated waveguides of the first and second chips are aligned to each other;
wherein the first and second integrated waveguides of the first chip are configured as an adiabatic coupler comprising a coupling section in which portions of the first and second integrated waveguides are disposed adjacent to each other in close proximity for coupling;
wherein the first chip comprises phase modulator circuitry to actively modify a phase of a signal propagating in portions of the second integrated waveguides of the adiabatic coupler;
wherein the first and second integrated waveguides of the second chip are separate from each other and are coupled to respective end portions of the first and second integrated waveguides that form the adiabatic coupler through the edge coupling of the first and second critical edges of the first and second chips; and
wherein the signal reflection structure of the second chip is configured to reflect separate signals propagating in the first and second integrated waveguides of the second chip to provide bi-directional signal propagation in the first and second integrated waveguides of the second chip such both the first and second integrated waveguides of the second chip provide signal input/output to/from the respective portions of the first and second integrated waveguides that form the adiabatic coupler.

10. The package structure of claim 9, wherein the first and second integrated waveguides of the second chip have end portions that terminate on third edge of the second chip, wherein the third edge of the second chip comprises the signal reflection structure.

11. The package structure of claim 10, further comprising a reflective coating disposed on the third edge of the second chip, wherein the reflective coating is configured to increase a signal reflectivity of the third edge of the second chip.

12. The package structure of claim 9, wherein the second chip comprises an optoelectronics chip with optical signal processing circuitry configured to process an optical signal propagating in at least one of first and second integrated waveguides of the second chip, wherein the optical signal processing circuitry comprises at least one of a semiconductor optical amplifier, an optoelectronic modulator, and a wavelength division multiplexer.

13. The package structure of claim 4, wherein the second chip comprises an optoelectronics chip with optical signal processing circuitry configured to process an optical signal propagating in at least one of first and second integrated waveguides of the second chip.

14. The package structure of claim 13, wherein the optical signal processing circuitry comprises at least one of a semiconductor optical amplifier, an optoelectronic modulator, and a wavelength division multiplexer.

15. The package structure of claim 5, wherein the second chip comprises an optoelectronics chip with optical signal processing circuitry configured to process an optical signal propagating in at least one of first and second integrated waveguides of the second chip.

16. The package structure of claim 15, wherein the optical signal processing circuitry comprises at least one of a semiconductor optical amplifier, an optoelectronic modulator, and a wavelength division multiplexer.

* * * * *